United States Patent

Gumpoltsberger et al.

(10) Patent No.: US 8,453,531 B2
(45) Date of Patent: Jun. 4, 2013

(54) DUAL CLUTCH TRANSMISSION

(75) Inventors: Gerhard Gumpoltsberger, Friedrichshafen (DE); Juergen Wafzig, Eriskirch (DE); Matthias Reisch, Ravensburg (DE); Wolfgang Rieger, Friedrichshafen (DE); Ralf Dreibholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 478 days.

(21) Appl. No.: 12/681,933

(22) PCT Filed: Oct. 8, 2008

(86) PCT No.: PCT/EP2008/063426
§ 371 (c)(1),
(2), (4) Date: Apr. 7, 2010

(87) PCT Pub. No.: WO2009/050074
PCT Pub. Date: Apr. 23, 2009

(65) Prior Publication Data
US 2010/0218629 A1    Sep. 2, 2010

(30) Foreign Application Priority Data
Oct. 15, 2007    (DE) .......................... 10 2007 049 262

(51) Int. Cl.
*F16H 3/08* (2006.01)

(52) U.S. Cl.
USPC .............................................. 74/330; 74/331

(58) Field of Classification Search
USPC ................................................... 74/330, 331
See application file for complete search history.

(56) References Cited

U.S. PATENT DOCUMENTS

| 6,244,123 | B1 | 6/2001 | Hegerath et al. |
| 7,246,536 | B2 | 7/2007 | Baldwin |
| 7,287,442 | B2 | 10/2007 | Gumpoltsberger |
| 2006/0054441 | A1 | 3/2006 | Ruedle |

FOREIGN PATENT DOCUMENTS

| DE | 38 22 330 A1 | 7/1989 |
| DE | 102 39 540 A1 | 3/2004 |
| DE | 103 05 241 A1 | 9/2004 |
| DE | 10 2004 001 961 A1 | 8/2005 |
| DE | 10 2004 012 909 A1 | 10/2005 |
| DE | 10 2005 028 532 A1 | 12/2006 |
| DE | 10 2005 045 005 A1 | 3/2007 |
| FR | 2 880 088 A1 | 6/2006 |
| GB | 2 424 250 A | 9/2006 |
| WO | 2005/068875 A3 | 7/2005 |
| WO | 2005/093289 A1 | 10/2005 |

OTHER PUBLICATIONS

Prof. Dr. R Tenberge; "Doppelkupplungsgetriebe in Planetenradbauweise Getriebestrukturen zwischen Automatikund Doppelkupplungsgetrieben" Wissenportal baumaschine de 3 2007.

*Primary Examiner* — William C Joyce
(74) *Attorney, Agent, or Firm* — Davis & Bujold, PLLC

(57) ABSTRACT

A double clutch transmission with two clutches connected to a drive shaft and to one of two transmission input shafts. Fixed gears are coupled to the input shafts and engage idler gears. Several coupling devices connect the idler gears to either first or second countershafts which each have an output gear that couple gears of an output shaft such that forward and reverse gears can be shifted. A shifting device couples gears to engage power shift forward and reverse gears. Two dual gear planes each comprising one fixed gear and two idler gears which are supported by a respective countershaft. In each dual gear plane, at least one idler gear wheel can be used for at least two gears. Two single gear planes each comprise an idler and fixed gear such that at least one power shift winding-gear is engaged by a shifting device.

17 Claims, 6 Drawing Sheets

| G | ZS | K1 | K2 | A | B | C | D | E | F | I | K | S_abi |
|---|---|---|---|---|---|---|---|---|---|---|---|---|
| G1 | i_3·i_4·i_2 |  | 1 |  |  | 1 |  |  |  |  |  | 1 |
| G2 | i_2 | 1 |  |  |  | 1 |  |  |  |  |  | 1 |
| G3 | i_3 |  | 1 |  |  |  | 1 |  |  |  |  | 1 |
| G4 | i_4 | 1 |  |  |  |  | 1 |  |  |  |  | 1 |
| G5 | i_5 |  | 1 | 1 |  |  |  |  |  |  |  | 1 |
| G6 | i_6 | 1 |  |  | 1 |  |  |  |  |  |  | 1 |
| G7 | i_4·i_3·i_5 | 1 |  | 1 |  |  |  |  |  |  | 1 | 1 |
| R- GEAR | | | | | | | | | | | | |
| R1 | i_R |  | 1 |  |  |  |  |  | 1 |  |  | 1 |
| R2 | i_5·i_6·i_R |  | 1 |  |  |  |  |  | 1 | 1 |  | 1 |
| R3 | i_3·i_4·i_R | 1 |  |  |  |  |  |  | 1 |  | 1 | 1 |
| LOW SPEED GEAR | | | | | | | | | | | | |
| C1 | i_2·i_5·i_3 | 1 |  | 1 |  | 1 | 1 |  |  |  |  |  |
| OVERDRIVE GEAR | | | | | | | | | | | | |
| O1 | i_5·i_2·i_4 |  | 1 | 1 |  | 1 |  | 1 |  |  |  |  |

Fig. 2

| G | ZS | K1 | K2 | A | B | C | D | E | F | I | K | S_ab1 |
|---|---|---|---|---|---|---|---|---|---|---|---|---|
| G1 | i_3·i_4·i_2 |  | 1 |  |  | 1 |  |  |  |  |  | 1 |
| G2 | i_2 | 1 |  |  |  | 1 |  |  |  |  |  | 1 |
| G3 | i_3 |  | 1 |  |  |  | 1 |  |  |  |  | 1 |
| G4 | i_4 | 1 |  | 1 |  |  |  |  |  |  |  | 1 |
| G5 | i_5 |  | 1 | 1 |  |  |  |  |  |  |  | 1 |
| G6 | i_6 | 1 |  |  | 1 |  |  |  |  |  |  | 1 |
| G7 | i_4·i_3·i_5 | 1 |  | 1 |  |  |  |  |  |  | 1 | 1 |
| R – GEAR | | | | | | | | | | | | |
| R1 | i_R | 1 |  |  |  |  |  |  | 1 |  |  | 1 |
| R2 | i_5·i_6·i_R |  | 1 |  |  |  |  |  | 1 | 1 |  | 1 |
| R3 | i_3·i_4·i_R |  |  |  |  |  |  |  | 1 | 1 | 1 | 1 |
| LOW SPEED GEAR | | | | | | | | | | | | |
| C1 | i_2·i_5·i_3 | 1 |  | 1 |  | 1 | 1 |  |  |  |  |  |
| OVERDRIVE GEAR | | | | | | | | | | | | |
| O1 | i_5·i_2·i_4 |  | 1 | 1 |  | 1 |  | 1 |  |  |  |  |

| G | ZS | K1 | K2 | A | B | C | D | E | F | I | K | S_ab1 | S_ab2 |
|---|---|---|---|---|---|---|---|---|---|---|---|---|---|
| G1 | i_3·i_4·i_2 |  | 1 |  |  |  |  |  |  |  |  | 1 | 1 |
| G2 | i_2 | 1 |  |  |  |  |  |  | 1 |  |  | 1 | 1 |
| G3 | i_3 | 1 | 1 |  |  |  | 1 |  |  |  |  | 1 | 1 |
| G4 | i_4 | 1 |  |  |  |  |  | 1 |  |  |  | 1 | 1 |
| G5 | i_5 |  | 1 | 1 |  |  |  |  |  |  |  | 1 | 1 |
| G6 | i_6 | 1 |  |  | 1 |  |  |  |  |  |  | 1 | 1 |
| G7 | i_4·i_3·i_5 | 1 |  | 1 |  |  |  |  |  |  | 1 | 1 | 1 |
| R-GEAR | | | | | | | | | | | | | | |
| R1 | i_5·i_R·i_4 |  | 1 | 1 |  | 1 |  |  |  |  |  |  | 1 |
| R2 | i_5·i_R·i_2 |  | 1 | 1 |  | 1 |  |  | 1 |  |  |  | 1 |
| R3 | i_R | 1 |  |  |  | 1 |  |  |  |  |  | 1 |  |
| OVERDRIVE GEAR | | | | | | | | | | | | | | |
| O1 | i_3·i_2·i_6 |  | 1 | 1 |  |  | 1 | 1 |  | 1 |  | 1 |  |

DUAL CLUTCH TRANSMISSION

This application is a National Stage completion of PCT/EP2008/063426 filed Oct. 8, 2008, which claims priority from German patent application serial no. 10 2007 049 262.8 filed Oct. 15, 2007.

FIELD OF THE INVENTION

The present invention relates to a dual clutch transmission for a motor vehicle.

BACKGROUND OF THE INVENTION

Known from the publication DE 103 05 241 A1 is a 6-speed or 7-speed dual clutch transmission. The dual clutch transmission comprises two clutches, each connected with their inputs to the drive shaft and with their output to one of the two transmission input shafts. The two transmission input shafts are coaxially positioned towards each other. In addition, two countershafts are positioned parallel to the transmission input shafts, their idler gear wheels mesh with the fixed gear wheels of the transmission input shafts. Furthermore, coupling devices are axially movable and rotationally fixed to the countershaft to shift the respective gear wheels. Each selected ratio is transferred by the drive gear wheels to a differential transmission. To achieve the desired gear ratio steps in this known dual clutch transmission, a vast number of gear planes are required, so that a significant amount of installation space is needed.

In addition, a spur gear change speed transmission is known from the publication DE 38 22 330 A1. The spur gear change speed transmission comprises a dual clutch, switchable under power, where one part is connected with a drive shaft and the other part with a hollow drive shaft, rotatably supported on the drive shaft. For certain gear ratios, the drive shaft can be coupled with the hollow drive shaft via a shifting device.

Known from the publication DE 10 2004 001 961 A1 is a power transmission with two clutches, which are each assigned to a partial transmission. The transmission input shafts of the two partial transmissions are coaxially arranged to each other and mesh, via fixed gear wheels, with idler gear wheels of the designated countershaft. The respective idler gear wheels of the countershafts can be connected in a rotationally fixed manner, with the respective countershaft via designated shifting devices. The particular idle wheels of the countershaft can be connected via the assigned shifting devices with the associated countershaft. A 7-gear transmission in a rotationally fixed manner is known through this publication in which an additional shift element is provided to connect the two transmissions input shafts to establish an additional transmission stage. The 7-gear transmission requires in this embodiment at least six gear planes in the two partial transmissions, to achieve the transmission ratio stages. This causes an unwanted extension of the construction length in axial direction, it is therefore significantly limiting the use in a motor vehicle.

SUMMARY OF THE INVENTION

It is the task of the present invention to propose a dual clutch transmission based on the previously described type, in which power engaging gear ratio steps can be realized, possibly cost-efficient and with just a few component parts, which need little installation space.

Thus, a dual clutch transmission with two clutches, optimized for needed installation space, is proposed, in which the inputs are connected with a drive shaft and the outputs are each connected with one of two transmission input shafts that are coaxial to each other. The dual clutch transmission comprises at least two countershafts, on which gear wheels, designed as idler gear wheels, are rotatably positioned, and on the two transmissions input shafts are gear wheels connected in a rotationally fixed manner as fixed gear wheels, which at least partially mesh with the idler gear wheels. In addition, several coupling devices are provided for connection of an idler gear wheel with a countershaft in a rotationally fixed manner. The dual clutch transmission, in accordance with the invention, has one output gear wheel each, or constant pinion at the two countershafts, which each are coupled with gears of a drive shaft, to connect the respective countershaft with the output, and has at least an actuating, or lockable shifting device as a so-called winding-path gear shifting device for a rotationally fixed connection of two gear wheels, whereby several power engaging forward gears and at least one reverse gear are implemented.

In accordance with the invention, the dual clutch transmission can comprise preferably just four gear planes for instance, two dual gear planes are provided, and, in each dual gear plane, an idler gear wheel is each assigned, on the first and the second countershaft, assigned to a fixed gear wheel of the transmission input shafts, whereby in each dual-gear plane at least one idler gear wheel can be used for at least two gears, and two single gear planes are provided, in which one idler gear wheel of the countershaft is assigned to a fixed gear wheel of one of the transmission input shafts, so that at least one winding-path gear is engaging via a first shifting device and at least one winding-path gear is engaging via an additional shifting device. Due to the possible multi-use of idler gear wheels, the proposed dual clutch transmission enables a maximum number of gear ratios with as few gear planes as possible, and preferably all forward gears and all reverse gears are power engaging at sequential execution.

Through the use of two single gear planes, instead of a dual gear plane, the inventive dual clutch transmission can achieve harmonious, progressive gear shifting, especially in the fourth, fifth, sixth, and seventh gear. In addition, a maximum of four shifting devices are used for each of shaft, which can be realized via shifting devices and/or coupling devices, with the need for, if necessary, a maximum of two actuation devices at each countershaft.

The inventive and presented dual clutch transmission can preferably be designed as a 7-gear transmission. Due to the short construction method, as compared to known transmission configurations, the inventive dual clutch transmission is especially applicable in a front-transverse construction method. However, other construction methods are also possible, and depend on the design and the available construction of the respective motor vehicle.

It can be provided, within the framework of the invention, that via a first shifting device on the second countershaft, an idler gear wheel of the second partial transmission can be connected with an idler gear wheel of the first partial transmission, whereby via the first shifting device at least a first forward gear, the seventh forward gear, and a reverse gear are each shiftable as a winding-path gear. Hence, the first forward gear and the seventh forward gear can be realized as winding-path gears through the gear wheels of the third forward gear and the fourth forward gear.

The inventive dual clutch transmission enables that, via one shifting device, winding-path gears can be realized in which the gear wheels of both partial transmissions are coupled, to enable hereby the flow of force via both partial transmissions. The respective, applied shifting device serves hereby for the coupling of two idler gear wheels and brings hereby the transmission input shafts into a dependency.

The positioning of the shifting devices to connect two defined idler gear wheels, independently of each embodiment of the dual clutch transmission, can vary, so that the shifting devices do not have to be necessarily positioned between the idler gear wheels which have to be connected. Thus, other positioning designs of each shifting device are conceivable, for instance to optimize the connection to an actuating device.

It can be provided, in accordance with a possible embodiment of the dual clutch transmission, that the first gear plane, designed as dual gear plane, comprises a fixed gear wheel on the second transmission input shaft of the second partial transmission, and that the second gear plane, designed as dual gear plane, as well as the third and fourth gear planes, designed as single gear planes, comprise three fixed gear wheels on the first transmission input shaft of the first partial transmission. However, it is also possible that the first gear plane, designed as a dual gear plane, comprises a fixed gear wheel on the second transmission input shaft of the second partial transmission, and that the second, and the third gear plane, designed as single gear planes, and the fourth gear plane, designed as a dual gear plane, three fixed gear wheels on the first transmission input shaft of the first partial transmission. Hereby, and independent from the respective embodiment variation, each of the four fixed gear wheels of the transmission input shafts can be used for at least two gears. In an advantageous design, only three idler gear wheels on a countershaft are required for the forward gear ratios, which mesh with fixed gear wheels of the transmission input shaft, and only two idler gear wheels are required on the other countershaft, which also mesh with fixed gear wheels of the transmission input shafts.

For the realization of reverse gears for this inventive dual clutch transmission, an intermediate gear wheel can be applied, and positioned on an intermediate shaft. It is also possible that one of the idler gear wheels of a countershaft serves for at least one reverse gear position. Thus, an additional intermediate shaft is not needed for the reverse gear transmission, because one of the idle wheels mashes with a fixed gear wheel, and an additional idle wheel of the other countershaft. Therefore the intermediate gear, required for the reverse gear, is positioned to engage an idler gear wheel on a countershaft and it also serves for the realization of at least one additional forward gear. The intermediate gear can always be designed as step gear, independent of whether it is positioned on the countershaft or on an additional intermediate shaft.

To obtain the desired transmission ratio steps, this inventive dual clutch transmission provides that on each countershaft at least one dual action coupling device is installed. The provided coupling devices, either in the activated or engaged condition, dependent on the direction of activation, can each connect an assigned idler gear wheel to the countershaft in a rotationally fixed manner. Also, a single action coupling device can be positioned on least one of the countershafts. Clutches, which are operating for instance as hydraulic, electric, pneumatic, mechanically operated clutches, or interlocking claw couplings can be utilized as coupling devices, as well as any kind of synchronization device which serves as the rotationally fixed connection of an idler gear wheel of a countershaft. It is possible to replace a dual action coupling device with two single action coupling devices and vice versa.

It is possible that the mentioned options for positioning of the gear wheels vary, and also the number of gear wheels and the number of coupling devices are altered to realize additional power engaging and non-power engaging gears, for further reduction of installation space and part cost reduction for this inventive dual clutch transmission. Especially fixed gear wheels of dual gear planes can be split into two fixed gear wheels for two single gear planes. Hereby, the shifting can be improved. It is also possible, to swap the countershafts. The partial transmissions can also be swapped, meaning mirror imaging around a vertical axle. Hereby, the hollow shaft and the solid shaft are swapped. It is possible hereby to position the smallest gear wheel on the solid shaft, to further optimize the use of the available installation space. In addition, neighboring gear planes can be swapped, to optimize, for example, a deflection of the shaft and/or to optimize connecting of a shifting actuator device. Also, the respective mounting position of the coupling devices on the gear plane can be varied. In addition, the direction of action of the coupling devices can be varied.

The gear numbering used in here is freely defined. It is also possible to add a crawler gear, to improve the off road characteristics or the acceleration performance for a motor vehicle. In addition, the first gear can be left out, for instance, to better optimize the entirety of the gear steps. The numbering of the gears varies through these measures accordingly.

Independently of the respective variations of the embodiments of the dual clutch transmission, the drive shaft and the output shaft can be positioned non-coaxial to each other, which enables an especially space saving configuration. For instance, the shafts which are positioned spatial one after another, can also be slightly offset to each other. In that configuration, a direct gear with the transmission ratio one can be realized by teeth meshing and can be shifted, relatively free, to the fourth, fifth, for sixth gear. A different configuration option of the drive shaft and the output shaft is also possible.

Preferably, the proposed dual clutch transmission is equipped with an integrated output stage. The output stage can comprise a fixed gear wheel as an output gear at the output shaft, which is meshes with a first output gear wheel, as a fixed gear wheel of the first countershaft, as well as with a second output gear wheel, as a fixed gear wheel of the second countershaft. However, it is possible that at least one of the output gear wheels is designed as a meshing gear wheel.

Advantageously, the lower forward gears and the reverse gears can be activated through a starting, or shifting clutch to focus higher loads on this clutch and to construct the second clutch with less need for installation space and as more cost-effective. Especially, the gear planes in the proposed dual clutch transmission can be positioned in a way that one can start, by way of the inner transmission input shaft or the outer transmission input shaft, always starting via the more appropriate clutch, which is also possible in a concentrically positioned, radially nested construction of the dual clutch. The gear planes can be positioned as mirror-symmetric, or swapped, respectively. It is also possible that the countershafts are swapped or positioned in a mirror imaging way.

Independent of the respective embodiments, the provided gear planes of the dual clutch transmission can be swapped. It is also possible, to use instead of a dual gear plane two single gear planes and/or vice versa. In addition, the two partial transmissions can be positioned as mirrored.

BRIEF DESCRIPTION OF THE DRAWINGS

Following, the present invention is further explained based on the drawings.

It shows:

FIG. 2 a shift scheme of the first embodiment variation in accordance with FIG. 1;

FIG. 4 a shift scheme of the second embodiment variation in accordance with FIG. 3;

FIG. 6 a shift scheme of the third embodiment variation in accordance with FIG. 5.

DETAILED DESCRIPTION OF THE PREFERRED EMBODIMENTS

Figure 1:
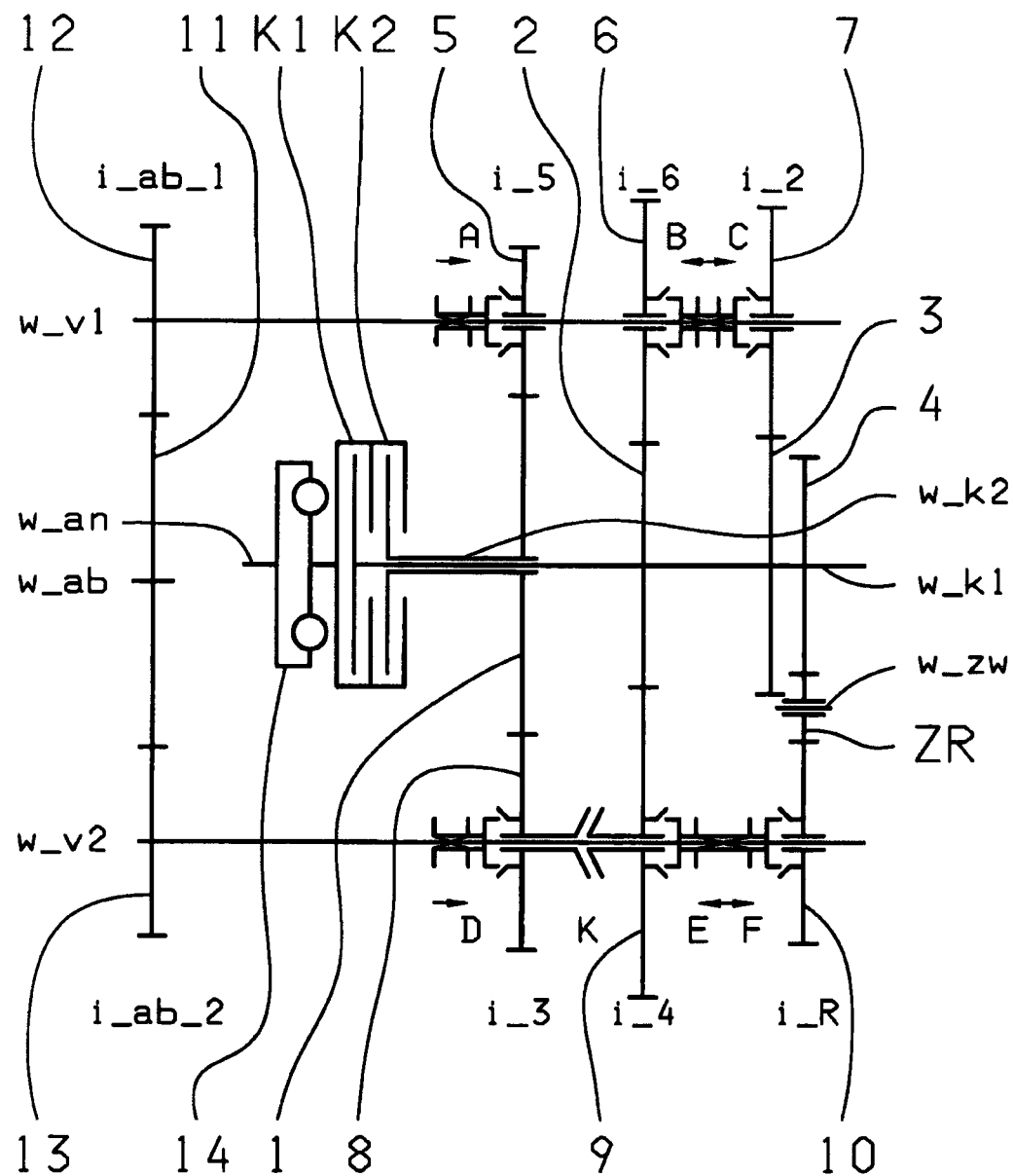
FIG. 1 a schematic view of a first embodiment variation of an inventive 7-gear dual clutch transmission.
Figure 3:
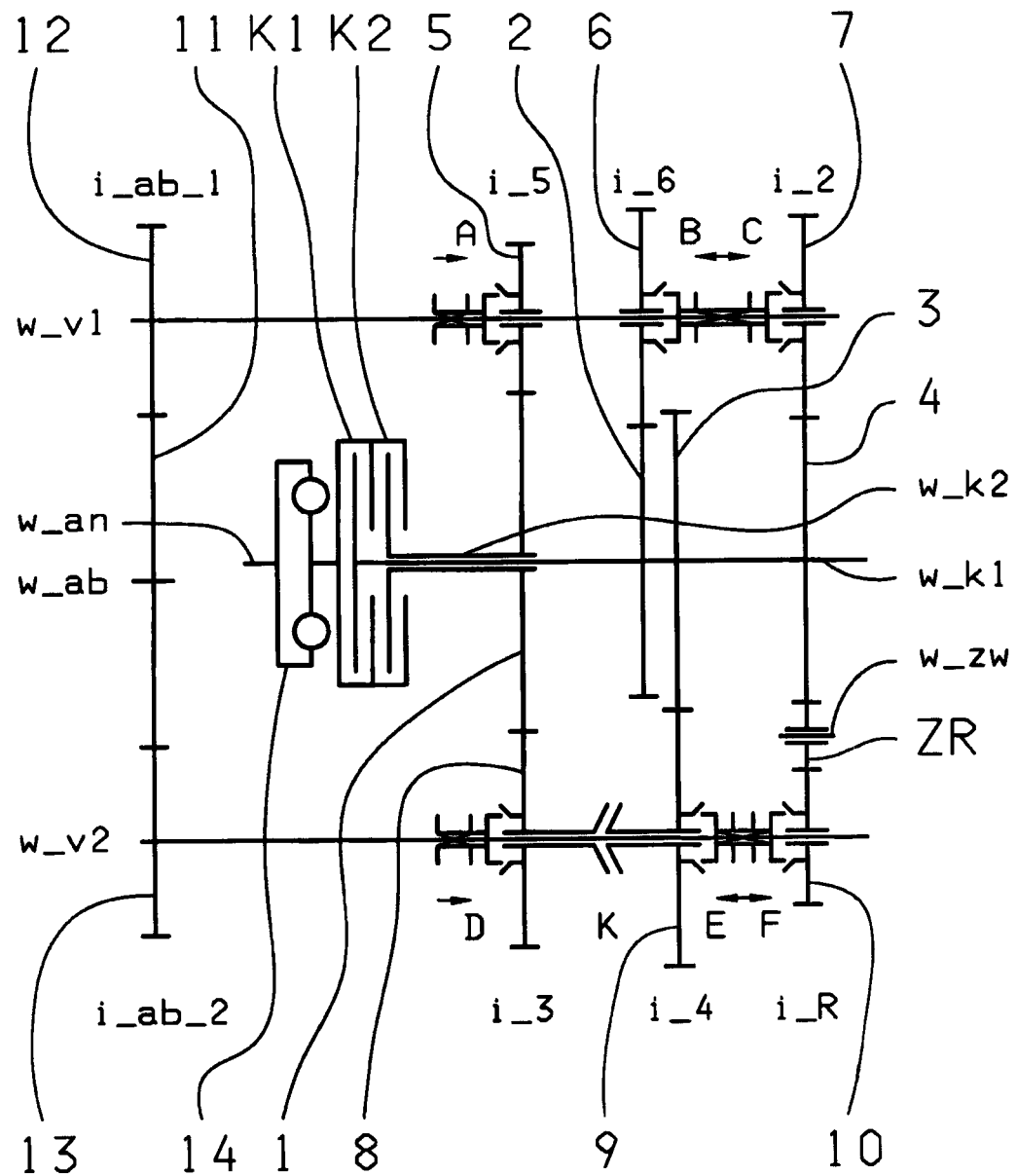
FIG. 3 a schematic view of a second embodiment variation of the inventive 7-gear dual clutch transmission.
Figure 5:
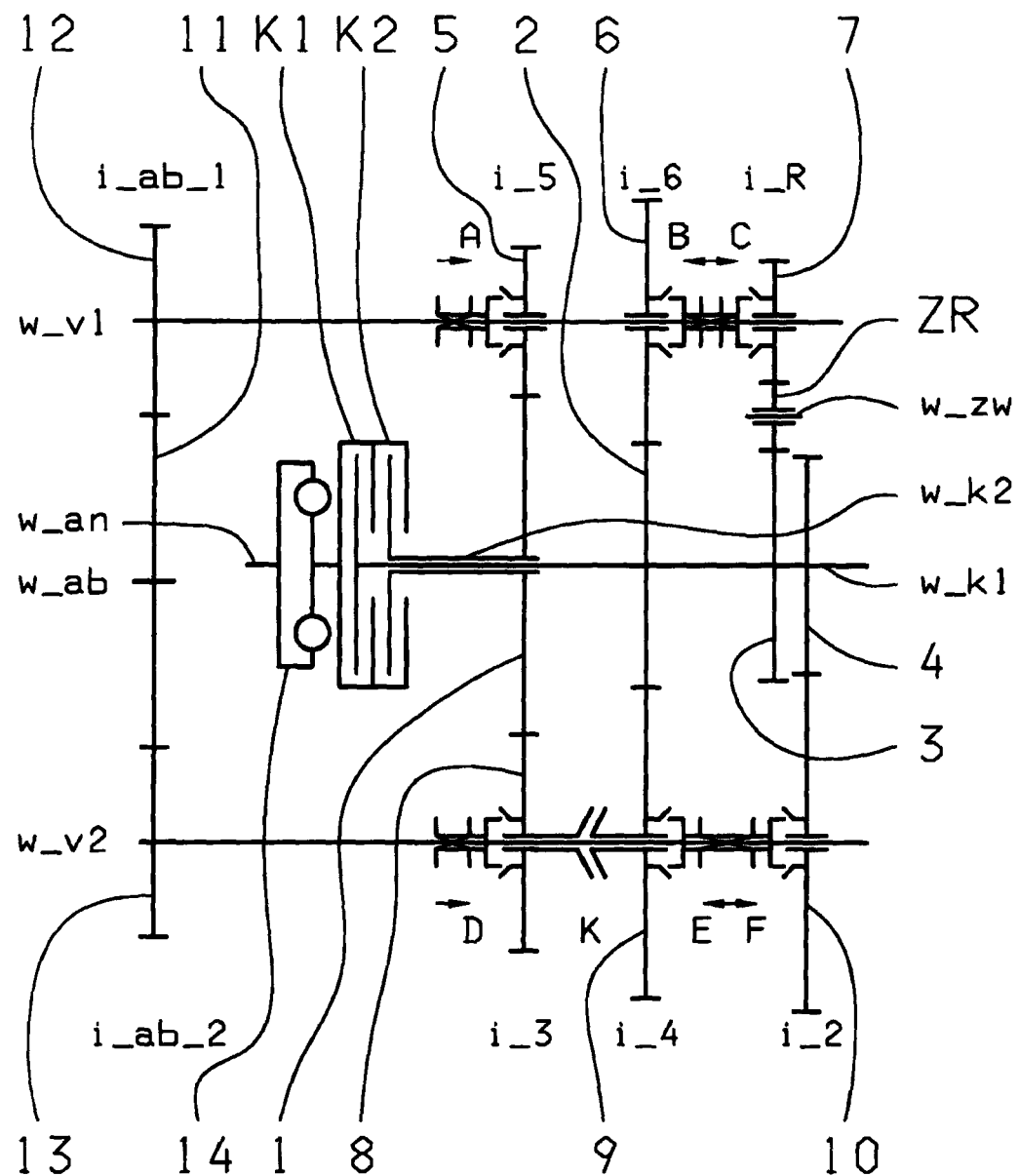
FIG. 5 a schematic view of a third embodiment variation of the inventive 7-gear dual clutch transmission.

In each of the FIGS. 1, 3, and 5, possible embodiments of the 7-gear dual clutch transmission are shown. The respective shift schemes of the embodiments are presented in FIGS. 2, 4, and 6 as tables.

The 7-gear dual clutch transmission comprises two clutches K1 and K2, in which the input sides are connected to a drive shaft w_an, and the output sides are each connected with one of the two, coaxially positioned towards each other, transmission input shafts w_K1, w_K2. Also a torsion vibration damper 14 can be positioned at the drive shaft w_an. In addition two countershafts w_v1, w_v2 are provided, on which gear wheels are rotatably supported and are designed as idler gear wheels 5, 6, 7, 8, 9, 10. On the two transmission input shafts w_K1, w_K2, gear wheels are rotatably positioned and designed as fixed gear wheels 1, 2, 3, 4, which at least partially mesh with the idler gear wheels 5, 6, 7, 8, 9, 10.

To connect the idler gear wheels 5, 6, 7, 8, 9, 10 with the respective countershaft w_v1, w_v2, several coupling devices A, B, C, D, E, F, which can be activated or engaged are provided with the countershaft w_v1, w_v2. In addition, drive gear wheels 12, 13 are positioned on the two countershafts w_v1, w_v2, designed as constant pinion, which each are coupled with gears of an output drive shaft w_ab.

Beside the coupling devices A, B, C, D, E, F, which provide a rotationally fixed connection between a gear wheel and the respective countershaft w_v1, w_v2, at least one winding-path gear shifting device K is provided in the dual clutch transmission to provide a rotationally fixed connection of two gear wheels of a countershaft w_v1, w_v2, to realize at least one winding-path gear.

In the first and third embodiments, the shifting device K is positioned between the first gear plane, designed as dual gear plane 5-8, and the second gear plane, designed as dual gear plane 6-9, and is positioned on the second countershaft w_v2, to connect the idler gear wheel 8 with the idler gear wheel 9. In a second embodiment variation, the shifting device K of the first gear plane, designed as dual gear plane 5-8 and the third gear plane, designed as single gear plane 3-9, is positioned on the second countershaft w_v2, to also connect the idler gear wheel 8 with the idler gear wheel 9.

Thus, and in accordance with the invention, the double clutch transmission has only four gear planes, whereby in each embodiment two dual gear planes 5-8, 6-9; 5-8, 7-10 are provided, and whereby two single gear planes 6-2, 3-9; 7-3, 4-10 are provided, so that at least one power shiftable winding-path gear can be shifted via a shifting device K. For instance, a claw can be used as shifting devices for K, I or similar, to connect two gear wheels.

In the first and third embodiment variation, in accordance with FIGS. 1 and 5, the two dual gear planes 5-8, 6-9, form the first and the second gear planes, and the two single gear planes 7-3, 4-10, form the third and fourth gear planes. Whereas in the second embodiment variation, in accordance with FIG. 3, the two dual gear planes 5-8, 7-10, are formed by the first and fourth gear planes, whereby both single gear planes 6-2, 3-9 are formed by the second and third gear planes.

In the first embodiment, in accordance with FIG. 1, in the first gear plane, designed as dual gear plane 5-8, the fixed gear wheel 1 with the second transmission input shaft w_K2, as well as with the idler gear wheel 5 of the first countershaft w_v1, and also with the idler gear wheel 8 of the second countershaft w_v2. In the second gear plane, designed as dual gear plane 6-9 the fixed gear wheel 2 of the first transmission input shaft w_K1 meshes with the idler gear wheel 6 of the first countershaft w_v1 as well as with the idler gear wheel 9 of the second countershaft w_v2. In the third gear plane, designed as single gear plane 7-3, the fixed gear wheel 3 of the first transmission input shaft w_K1 meshes with the idler gear wheel 7 of the first countershaft w_v1. Finally, in the fourth gear plane, designed as single gear plane 4-10, the fixed gear wheel 4 of the first transmission input shaft w_K1 meshes with an intermediate gear ZR, whereby the intermediate gear ZR enables the reversal of rotation to realize a reverse gear R1, R2, R3. The intermediate gear ZR is rotatably positioned on the intermediate shaft w_zw, whereby the intermediate shaft w_zw, is positioned in parallel to the countershafts w_v1, w_v2. The intermediate gear ZR also meshes with the idler gear wheel 10 of the second countershaft w_v2.

The third embodiment, in accordance with FIG. 5, is only different from the first embodiment by enabling the rotation reversal for the reverse gears, in the third embodiment, in the third gear plane, designed as single gear plane 7-3.

In the second embodiment, in accordance with FIG. 2, in the first gear plane, designed as a dual gear plane 5-8, the fixed gear wheel 1 of the second transmission input shaft w_K2 meshes with the idler gear wheel 5 of the a first countershaft w_v1, as well as with the idler gear wheel 8 of the second countershaft w_v2. In the second gear plane, designed as a single gear plane 6-2, the fixed gear wheel 2 of the first transmission input shaft w_K1 meshes only with the idler gear wheel 6 of the first countershaft w_v1. Finally, in the fourth gear plane, designed as single gear plane 4-10, the fixed gear wheel 4 of the first transmission input shaft w_K1 meshes with an intermediate gear ZR, whereby the intermediate gear ZR enables the reversal of rotation to realize a reverse gear R1, R2, R3. The intermediate gear ZR is rotatably positioned on an intermediate shaft w_zw, whereby the intermediate shaft w_zw, in this example, is positioned parallel to the countershafts w_v1, w_v2. The intermediate gear ZR also meshes with the idler gear wheel 10 of the second countershaft w_v2.

The third embodiment, in accordance with FIG. 5, differs from the first embodiment creation shafts by the fact, that the rotation reversal, to realize the reverse gears, are provided in the third embodiment in the third gear plane, designed as single gear plane 7-3.

In the second embodiment variation, in accordance with FIG. 2, the fixed gear wheel 1 of the second transmission input shaft w_K2 meshes with the idler gear wheel 5 of the first countershaft w_v1, as well as with the idler gear wheel 8 of the second countershaft w_v2. In the second gear plane, designed as a single gear plane 6-2, the fixed gear wheel 2 of the first transmission input shaft w_K1 meshes only with the fixed gear wheel 6 of the first transmission input shaft w_K1. In the third gear plane, designed as a single gear plane 3-9, the fixed gear wheel 3 of the first transmission input shaft w_K1, meshes with the idler gear wheel 9 of the second countershaft w_v2. Finally, in the fourth gear plane, designed as a dual gear plane 7-10, the fixed gear wheel 4 of the first transmission input shaft w_K1 meshes with the idler gear wheel 7 of the first countershaft w_v1, as well as with an intermediate gear ZR. whereby the intermediate gear ZR enables the reversal of rotation for a reverse gear R1, R2, R3. The intermediate gear ZR is rotatably positioned positioned on an intermediate shaft w_zw parallel to the countershafts w_v1, w_v2. The intermediate gear meshes also with the idler gear wheel 10 of the second countershaft w_v2.

On each countershaft w_v1, w_v2, in this example, a dual action coupling device B, C; E, F is provided whereby on the first countershaft w_v1 the dual action coupling device B, C is positioned between the second gear plane, designed as a double gear plane 6-9, and the third gear plane, designed as a single gear plane 7-3 and that on the second countershaft w_v2 the dual action coupling device E, F is positioned between the second gear plane, designed as a dual gear plane 6-9 and the fourth gear plane, designed as a single gear plane 4-10. For each dual action coupling device B, C; E, F, also two single action coupling devices can be provided. Via the coupling device B, the idler gear wheel 6 can be connected with the first countershaft w_v1 and via the coupling device C, the idler gear wheel 7 can be connected with the first countershaft w_v1. Via the coupling device E, the idler gear wheel 9 can be connected with the a second countershaft w_v2, and via the coupling device F, the idler gear wheel 10 can be connected with the second countershaft w_v2. The second embodiment, in accordance with FIG. 3, only differs by the fact, that the dual action coupling device E, F is positioned on the second countershaft w_v2, between the third gear plane, designed as a single gear plane 3-9, and the fourth gear plane, designed as a dual gear plane 7-10.

To connect the idler gear wheel 5 with the first countershaft w_v1, a single action coupling device A is assigned to the first gear plane, designed as a dual gear plane 5-8. In addition, a single action coupling device D is assigned to the first gear plane, designed as a dual gear plane 5-8, to connect the idler gear wheel 8 with the second countershaft w_v2.

In the inventive double clutch transmission, an integrated output stage is provided, having the output gear wheel 12, which is connected with the first countershaft w_v1 in a rotationally fixed manner, and having the output gear wheel 13, which is connected in a rotationally fixed manner with the second countershaft w_v2. The output gear wheel 12 and the output gear wheel 13 each mesh with a fixed gear wheel 11 of the output shaft w_ab. However, other shiftable connections are possible between the output gear wheels 12, 13 and the respectively assigned countershaft w_v1, w_v2.

FIGS. 2 and 4 present in the respective table an exemplary shift scheme for the first and second embodiments of the 7-gear double clutch transmission, in accordance with FIGS. 1 and 3.

It can be seen in the shifting schemes, that the first forward gear G1 can be shifted via the second clutch K2 and via the activated coupling device C, as well as via the activated shifting device K as a winding-path gear, the second forward gear G2 can be shifted via the first clutch K1 and via the activated coupling device C, the third forward gear G3 can be shifted via the second clutch K2 and via the activated coupling device D, the fourth gear G4 can be shifted via the first clutch K1 and via the activated coupling device E, the fifth forward gear G5 can be shifted via the second clutch K2 and via the activated coupling device A, the sixth gear G6 can be shifted via the first clutch K1 and via the activated coupling device B and that the seventh forward gear G7 can be shifted via the first clutch K1 and via the activated coupling device A, and via the activated shifting device K as a winding-path gear.

It can also be seen in the shifting scheme, that the first reverse gear R1 can be shifted via the first clutch K1 and via the activated coupling device F, and that an additional reverse gear R3 can be shifted via the second clutch K2 and via the activated coupling device F and via the activated shifting element K as a winding-path gear.

In the first and second embodiments, if a shifting device I is assigned to the first countershaft w_v1, to connect the idler gear wheel 5 with the idler gear wheel 6 in a rotationally fixed manner, in an activated or engaged condition of the shifting device I, an additional reverse gear R2 can be shifted via the second clutch K2 and via the activated coupling device F as a winding-path gear.

In addition, for the first and the second embodiments of the double clutch transmission, a low speed gear C1 can be shifted, as a winding-path gear, via the first clutch K1, via the activated coupling device A, via the activated coupling device C, and via the activated coupling device D, a disengaged coupling device S_ab1 and assigned to the output gear wheel 12, not shown in the schematic views for simplicity reasons in a disengaged condition of the coupling device S_ab1, the output gear wheel 12 is disconnected from the assigned first countershaft w_v1. In addition, an overdrive gear O1 can be shifted via the second clutch K2, via the activated coupling device A, via the activated coupling device C, and via the activated coupling device E, and the disengaged coupling device S_ab1 and assigned to the output gear wheel 12, as a winding-path gear.

From the shifting scheme in accordance with FIG. 2, or 4 it can be seen that in the first forward gear G1, beginning from the second clutch K2, the gear steps i_3, i_4, and i_2 are used, whereby the two partial transmissions are coupled via the shifting device K. In the second forward gear G2, only the gear step i_2 is used, in the third forward gear G3 the gear wheel step i_3 is used, in the fourth forward gear G4, the gear wheel step i_4 is used, in the fifth forward gear G5, the gear wheel step i_5 is used, and in the sixth forward gear G6, the gear wheel step i_6 is used. In the seventh forward gear G7, the gear steps i_4, i_3, and i_5 are used, whereby the two partial transmissions are again coupled via the shifting device K. In the reverse gear R1, only the gear step i_R is used, whereby the additional, possible reverse gear R2, is winding-path gear, uses the gear wheel steps i_5, i_6, and i_R, to couple the 2 partial transmissions via the additional shifting element I. In another reverse gear R3 the gear wheel steps i_3, i_4, and i_R, couple the two partial transmissions via the shifting device K. In the low speed gear C1, the gear wheel steps i_2, i_5, and i_3 are used, where by the possibility for coupling the two partial transmissions is realized through the disengaged coupling device S_ab1, which is assigned to the output gear wheel 12 on the first countershaft w_v1. For the overdrive gear O1, the gear wheel steps i_5, i_2, and i_4 are used, whereby the possibility for coupling the two partial transmissions is realized through the disengaged coupling device S_ab1, which is assigned to the output gear wheel 12 on the first countershaft w_v1.

In the a first embodiment, in accordance with FIG. 1, the gear wheel step i_2 of the second forward gear G2, and the gear wheel step i_R of the reverse gears R1, R2, R3 are each assigned to a single gear plane 7-3, 4-10, so that the first forward gear G1 can be better adjusted, and the second forward gear G2, as well as the reverse gear R can be freely adjusted. In the second embodiment variation, in accordance with FIG. 3, the gear wheel step i_4 of the a fourth forward gear G4, and the gear wheel step i_6 of the sixth forward gear G6 are each assigned to a single gear plane 6-2, 3-9, whereby shifting of the forward gears G4 to G7 can be presented progressively.

In the table of FIG. 6, an example of a shifting scheme for the third embodiment of the 7-gear double clutch transmission, in accordance with FIG. 5, is shown.

From this shifting scheme it can be seen, that the first forward gear G1 can be shifted via a second clutch K2 and via the activated coupling device F, and via the activated, or engaged. Shifting device K, as a winding-path gear, the second forward gear G2 can be shifted via the first clutch K1 and via the activated coupling device F, the third forward gear G3 can be shifted via the second clutch K2 and via the activated coupling device D, that the fourth forward gear G4 can be shifted via the first clutch K1 and via the activated coupling device E, the fifth forward gear G5 can be shifted via the second clutch K2 and via the activated coupling device A, the sixth forward gear G6 can be shifted via the first clutch K1 and via the activated coupling device B, and the seventh forward gear G7 can be shifted via the of first clutch K1 and via the activated coupling device A, and via the activated shifting device K as a winding-path gear. The shifting scheme also presents that a reverse gear R3 can be shifted via a first clutch K1 and via the activated coupling device C.

In the third embodiment variation, if an additional coupling device S_ab1 is provided, which is assigned to the output gear wheel 12 and which disconnects the output gear 12 from the first countershaft w_v1 in a non-engaged condition, an additional reverse gear R1 can be shifted via the second clutch K2, via the activated coupling device A, via the activated coupling device C, and via the activated coupling device E, as well as a winding-path gear at the non-engaged coupling device S_ab1, assigned to the output gear wheel 12. Also, an additional reverse gear R2 can be shifted via the second clutch K2, via the activated coupling device A, via the activated coupling device C, and via the activated coupling device F, as well as a winding-path gear at disengaged coupling device S_ab1, assigned to the output gear wheel 12.

Furthermore, it is possible in the third embodiment to shift an overdrive gear O1 and as a winding-path gear, via the second clutch K2, via the activated coupling device B, via the activated coupling device D, and via the activated coupling device F, with an additional non-engaged coupling device S_ab2 which is assigned to the output wheel 13. If the coupling device S_ab2 is in a non-engaged condition, the output gear wheel 13 is disconnected from the second countershaft w_v2.

The shift scheme, in accordance with FIG. 6, shows in particular that in the first forward gear G1, beginning at the second clutch K2, the gear wheel steps i_3, i_4, and i_2 are used, whereby the two partial transmissions are coupled via the shifting element K. In the second forward gear G2, only the gear wheel step i_2 is used, in the third forward gear G3 the gear wheel step i_3 is used, in the fourth forward gear G4 the gear wheel step i_4 is used, in the fifth forward gear G5, the gear wheel step i_5 is used and in the sixth forward gear G6, the gear wheel step i_6 is used. In the seventh forward gear G7, the gear wheel steps i_4, i_3, and i_5 are used, whereby the two partial transmissions are coupled again with each other via the shifting device K. in the reverse gear R1, the gear wheel steps i_5, i_R, i_4, and reverse gear R2, the gear wheel steps i_5, i_R, i_2 are used, whereby both reverse gears R1 and R2 are shifted as winding-path gears, whereby the possibility for the coupling of the 2 are sure transmissions is realized through the non-engaged coupling device S_ab1, which is assigned to the output gear wheel 12 at the first countershaft w_v1. The next possible reverse gear R3 only uses the gear wheel step i_R. For the overdrive gear, as a winding-path gear, the gear wheel steps i_3, i_2, i_6 are used, whereby the possibility for the coupling of the two partial transmissions is realized through the non-engaged coupling device S_ab2, which is assigned to the output gear wheel 13 on the second countershaft w_v2.

Therefore, in the third embodiment in accordance with FIG. 5, the gear wheel steps i_2, i_3, and i_4 are positioned on the second countershaft w_v2, whereby advantages are arising in regard to the hearing design and in regard pull the shaft bearing and the shaft design.

Independent of the respective embodiment, if the low speed gear C1 and/or the overdrive gear O1 are not used, a disconnection of the output gear wheel 12, or 13 respectively, from the countershaft w_v1, w_v2 is not necessary and therefore, the coupling device S_ab1 or S_ab2 can be omitted for shifting the forward gear G1 to G7 and for the shifting the reverse gears R1, R2, R3. However, when the low speed gear C1 and/or the overdrive gear O1 are used, via coupling device S_ab1 or S_ab2 so that the coupling device S_ab1 or S_ab2 needs to be partially engaged for shifting of the forward gears G1 to G7 the reverse gears R1, R2, R3.

Independent of the respective embodiment, both partial transmissions are used in the first forward gear G1 and in the highest forward gear G7 and at least in one reverse gear, because they are winding-path gears. The first power shiftable forward gear is also a winding-path gear. In addition the gear wheel steps i_3 and i_5 of the power shiftable forward gears G3 and G5, are positioned together in the first gear plane, designed as dual gear plane 5-8. Also, the gear wheel steps i_2 and i_R are positioned together in the third dual gear plane 7-10, or in two neighboring single gear planes 7-3 and 4-10, respectively, in the second and third embodiments.

Summarizing the first embodiment variation, in accordance with FIG. 1, it can be seen that in the first gear plane, designed as a dual gear plane 5-8, the idler gear wheel 5 is used for four forward gears G5, G7, C1, O1 and for one reverse gear R2, and the idler gear wheel 8 for four forward gears G1, G3, G7, C1 and for one reverse gear R3. In the second gear plane, designed as a dual gear plane 6-9, the idler gear wheel 6 can be used for one forward gear G6 and for one reverse gear R2, and the idler gear wheel 9 for four forward gears G1, G4, G7, O1 and for one reverse gear R3. Also in the third gear plane, designed as a single gear plane 7-3, the idler gear wheel 7 can be used for four forward gears G1, G2, C1, O1 and for one reverse gear R3. Finally in the fourth gear plane, designed as a dual gear plane 7-10, the idler gear wheel 10 can be used for 3 reverse gears R1, R2, R3 and the idler gear wheel 7 can be used for four forward gears G1, G2, C1, O1.

Summarizing the third embodiment variation, in accordance with FIG. 6, it can be seen that in the first gear plane, designed as a dual gear plane 5-8, the idler gear wheel 5 can be used for two forward gears G5, G7 and for two reverse gears R1, R2 and the idler gear wheel 8 can be used for four forward gears G1, G3, G7, O1. In the second gear plane, designed as dual gear plane 6-9, the idler gear wheel 6 can be used for two forward gears G6, O1 and the idler gear wheel 9 can be used for three forward gears G1, G4, G7 and for one reverse gear R1. Also, in the third gear plane, designed as a single gear plane 7-3, the idler gear wheel 7 can be used for three reverse gears. Finally in the fourth gear plane, designed as a single gear plane 4-10, the idler gear wheel 10 can be used for three forward gears G1, G2, O1, and for one reverse gear R2.

In all embodiments of the double clutch transmission and due to the provided multiple use of certain idler gear wheels, less gear planes are required and therefore less parts, but still having the same amount of gears, is resulting in an advantageous construction space saving and in a cost reduction.

Independent of the respective embodiment variation, with regard to the numeral "1" in the boxes of the respective tables, in accordance with FIGS. 2 and 4, of the shift schemes means that the associated clutch K1, K2, or the associated coupling devices A, B, C, D, E, F respectively, or the associated shifting devices K, I are engaged. In contrast, an empty box in the respective table, in accordance with FIGS. 2 and 4, of the shift schemes means that the associated clutch K1, K2, or the associated coupling device A, B, C, D, E, F, respectively, or the associated shifting device K, I, respectively, is each disengaged.

Deviating from the previously mentioned rules, it applies for the coupling device S_ab1, or S_ab2 assigned to a drive gear wheel 12, or 13, respectively, that the coupling device S_ab1 or S_ab2 in case of an empty box in the associated table of the shift schemes, in accordance with FIGS. 2 and 4, must be disengaged but that, a box having the numeral "1", depending from the gear in a first group of gears, the coupling device S_ab1 or S_ab2 must be engaged, and in a second group of gears, the coupling device S_ab1 or S_ab2 can be both disengaged or also engaged. In addition, there is the possibility in many cases to add additional coupling devices or shifting devices, without affecting the flow of force. A gear pre-selection is hereby enabled.

| | Reference Characters |
|---|---|
| 1 | Fixed gear wheel of the second transmission input shaft |
| 2 | Fixed gear wheel of the first transmission input shaft |
| 3 | Fixed gear wheel of the first transmission input shaft |
| 5 | Idler gear wheel of the first countershaft |
| 6 | Idler gear wheel of the first countershaft |
| 7 | Idler gear wheel of the first countershaft |
| 8 | Idler gear wheel of the second countershaft |
| 9 | Idler gear wheel of the second countershaft |
| 10 | Idler gear wheel of the second countershaft |
| K1 | first clutch |
| K2 | second clutch |
| w_an | Drive Shaft |
| w_ab | Drive Shaft |
| w_v1 | first Countershaft |
| w_v2 | second Countershaft |
| A | Coupling Device |
| B | Coupling Device |
| C | Coupling Device |
| D | Coupling Device |
| E | Coupling Device |
| F | Coupling Device |
| i_1 | Gear Wheel Step, first forward gear |
| i_2 | Gear Wheel Step, second forward gear |
| i_3 | Gear Wheel Step, third forward gear |
| i_4 | Gear Wheel Step, fourth forward gear |
| i_5 | Gear Wheel Step, fifth forward gear |
| i_6 | Gear Wheel Step, sixth forward gear |
| G1 | First forward gear |
| G2 | Second forward gear |
| G3 | Third forward gear |
| G4 | Fourth forward gear |
| G5 | Fifth forward gear |
| G6 | Sixth forward gear |
| G7 | Seventh forward gear |
| C1 | Low Speed Gear |
| O1 | Overdrive Gear |
| R1 | Reverse Gear |
| R2 | Reverse Gear |
| R3 | Reverse Gear |
| w_zw | Intermediate Shaft |
| ZR | Intermediate Gear |
| 11 | Fixed gear wheel of the Drive Shaft |
| 12 | Drive Gear Wheel of the first Countershaft |
| 13 | Drive Gear Wheel of the second Countershaft |
| 14 | Torsion Vibration Damper |
| ZS | Gear Wheel Step in use |
| K | Shifting device |
| I | Shifting device |
| S_ab1 | Coupling Device, optional |
| S_ab2 | Coupling Device, optional |

The invention claimed is:

1. A double clutch transmission comprising:
first and second clutches (K1, K2) each having an input side connected to a drive input shaft (w_an) and an output side respectively connected to one of first and second transmission input shafts (w_k1, w_k2) arranged coaxially with one another;
at least first and second countershafts (w_v1, w_v2) rotatably supporting idler gear wheels (5, 6, 7, 8, 9, 10);
only one fixed gear wheel (1) being connected, in a rotationally fixed manner, on the second transmission input shaft (w_K2) and a plurality of fixed gear wheels (2, 3, 4) being connected, in a rotationally fixed manner, on the first transmission input shaft (w_K1); and
the one fixed gear wheel (1) on the second transmission input shaft (w_K2) engaging one idler gear wheel on the first countershaft (w_v1) and one idler gear wheel on the second countershaft (w_v2) while one fixed gear wheel (2 or 4) on the first transmission input shaft (w_K1) engaging one idler gear wheel on the first countershaft (w_v1) and one idler gear wheel on the second countershaft (w_v2);
a plurality of coupling devices (A, B, C, D, E, F) being supported on one of the first and the second countershafts (w_v1, w_v2), and each of the coupling devices (A, B, C, D, E, F) coupling an idler gear wheel (5, 6, 7, 8, 9, 10) in a rotationally fixed manner to one of the first and the second countershafts (w_v1, w_v2);
first and second output gear wheels (12, 13) each engaging gearing of an output shaft (w_ab),
at least one shifting device (K), supported on one of the first and the second countershafts (w_v1, w_v2), for directly connecting first and second adjacent idler gear wheels, on the same countershaft (w_v1 or w_v2), with one another such that several power shiftable forward gears (1, 2, 3, 4, 5, 6) and at least one reverse gear (R1, R2, R3) are shiftable, a first one of the plurality of coupling devices (D) selectively couples the first adjacent idler gear wheel to the countershaft (w_v1 or w_v2) which supports the at least one shifting device (K) while a second one of the plurality of coupling devices (E) selectively couples the second adjacent idler gear wheel to the countershaft (w_v1 or w_v2) which supports the at least one shifting device (K);
first and second dual gear planes (5-8, 7-10; 5-8, 6-9), each of the first and the second dual gear planes comprising an idler gear wheel (5, 8, 9, 7, 10) supported by the first countershaft (w_v1), an idler gear wheel (5, 8, 9, 7, 10) supported by the second countershaft (w_v1, w_v2) and a fixed gear wheel (1, 2, 3, 4) supported by one of the first and the second transmission input shafts (w_k1, w_k2), and at least one of the idler gear wheels (5, 6, 7, 8, 9, 10) supported by the first and the second countershafts (w_v1, w_v2) in each of the first and the second dual gear planes (5-8, 7-10; 5-8, 6-9) being utilized for implementing at least two of the gears; and first and second single gear planes (6-2, 3-9; 7-3, 4-10), each comprising an idler gear wheel (5, 8, 6, 9, 7, 10) supported by one of the first and the second countershafts (w_v1, w_v2) and a fixed gear wheel (1, 2, 3, 4) supported by one of the first and the second transmission input shafts (w_k1, w_k2), such that at least one powershift winding-path gear is shiftable via the at least one shifting device (K).

2. The double clutch transmission according to claim 1, wherein a first forward gear (G1) and a seventh forward gear (G7) are engaged as a winding-path gear by engagement of the at least one shifting device (K), located on the second countershaft (w_v2), which couples an idler gear wheel (8) of a second partial transmission and an idle gear (9) of the first partial transmission.

3. The double clutch transmission according to claim 1, wherein a reverse gear (R3) is engaged as a winding-path gear by engagement of the at least one shifting device (K), on the second countershaft (w_v2), which couples an idler gear wheel (8) of a second partial transmission with an idler gear wheel (9) of a first partial transmission.

4. The double clutch transmission according to claim 1, wherein the first dual gear plane (5-8) comprises the one fixed gear wheel (1) on the second transmission input shaft (w_k2) of a second partial transmission, and the second dual gear plane (6-9) forms a second gear plane and the first and the second single gear planes (7-3, 4-10) respectively form third and fourth gear planes, and the second, third and fourth gear planes comprise three fixed gear wheels (2, 3, 4) on the first transmission input shaft (w_k1) of a first partial transmission.

5. The double clutch transmission according to claim 1, wherein the first dual gear plane (5-8) comprises the one fixed gear wheel (1) on the second transmission input shaft (w_k2) of a second partial transmission, and first and the second single gear planes (6-2, 3-9), and the second dual gear plane (7-10) comprise three fixed gear wheels (2, 3, 4) on the of first transmission input shaft (w_k1) of a first partial transmission.

6. The dual clutch transmission according to claim 1, wherein a first forward gear (G1) is engaged as a winding-path gear by engagement of the second clutch (K2), a third coupling device (C), and the at least one shifting device (K);

a second forward gear (G2) is engaged by engagement of the first clutch (K1) and the third coupling device (C);

a third forward gear (G3) is engaged by engagement of the second clutch (K2) and a fourth coupling device (D);

a fourth forward gear (G4) is engaged by engagement of the first clutch (K1) and a fifth coupling device (E);

a fifth forward gear (G5) is engaged by engagement of the second clutch (K2) and a first coupling device (A);

a sixth gear (G6) is engaged by engagement of the first clutch (K1) and a second coupling device (B); and a seventh forward gear (G7) is engaged as a winding-path gear by engagement of the first clutch (K1), the first coupling device (A), and the at least one shifting device (K).

7. The double clutch transmission according to claim 6, wherein a reverse gear (R1) is engaged by engagement of the first clutch (K1) and a sixth coupling device (F), and an additional reverse gear (R3) is engaged as a winding-path gear by engagement of the second clutch (K2) and the sixth coupling device (F), and engagement of the at least one shifting device (K).

8. The double clutch transmission according to claim 6, wherein an additional reverse gear (R2) is engaged as a winding-path gear by engagement of the second clutch (K2), a sixth coupling device (F), and an additional shifting device (I).

9. The double clutch transmission according to claim 6, wherein a low speed gear (C1) is shifted via engagement of the first clutch (K1), the first coupling device (A), the third coupling device (C) and the fourth coupling device (D), as well as with an additional, non-engaged coupling device (S_ab1) and assigned to the first output gear wheel (12), as a winding-path gear.

10. The double clutch transmission according to claim 6, wherein a overdrive gear (01) is engaged as a winding-path gear by engagement of the second clutch (K2), the first coupling device (A), the third coupling device (C), and a seventh coupling device (E), and disengagement of an additional coupling device (S_ab1), which is assigned to the first output gear wheel (12).

11. The double clutch transmission according to claim 1, wherein a first forward gear (G1) is engaged as a winding-path gear by engagement of the second clutch (K2), a fifth coupling device (F), and the at least one shifting device (K);

a second forward gear (G2) is engaged by engagement of the first clutch (K1) and the fifth coupling device (F);

a third forward gear (G3) is engaged by engagement of the second clutch (K2) and a third coupling device (D);

a fourth forward gear (G4) is engaged by engagement of the first clutch (K1) and a fourth coupling device (E);

a fifth forward gear (G5) is engaged by engagement of the second clutch (K2) and a first coupling device (A);

a sixth forward gear (G6) is engaged by engagement of the first clutch (K1) and a second coupling device (B);

a seventh forward gear (G7) is engaged as a winding-path gear by engagement of the first clutch (K1), the first coupling device (A) and the at least one shifting device (K).

12. The double clutch transmission according to claim 11, wherein a reverse gear (R3) is engaged by engagement of the first clutch (K1) and a sixth coupling device (C).

13. The double clutch transmission according to claim 11, wherein a reverse gear (R1) is engaged as a winding-path gear by engagement of the second clutch (K2), the first coupling device (A), the sixth coupling device (C), and the fourth coupling device (E), and disengagement of an additional coupling device (S_ab1) assigned to the first output gear wheel (12).

14. The double clutch transmission according to claim 11, wherein a reverse gear (R2) is engaged as a winding-path gear by engagement of the second clutch (K2), the first coupling device (A), the sixth coupling device (C) and the fifth coupling device (F), and disengagement of an additional coupling device (S_ab1), assigned to the first output gear wheel (12).

15. The double clutch transmission according to claim 11, wherein an overdrive gear (01) is engaged as a winding-path gear by engagement of the second clutch (K2), the second coupling device (B), the third coupling device (D), and the fifth coupling device (F), and disengagement of an additional coupling device (S_ab2), assigned to the first output gear wheel (13). a6

16. A double clutch transmission having seven forward gears and three reverse gears, the double clutch transmission comprising:

first and second clutches (K1, K2) each having an input side connected to a drive input shaft (w_an) and an output side respectively connected to one of first and second transmission input shafts (w_k1, w_k2) arranged coaxially with one another;

at least first and second countershafts (w_v1, w_v2) rotatably supporting idler gear wheels (5, 6, 7, 8, 9, 10);

only a single fixed gear wheel being supported by the second transmission input shaft (w_k2) while only three fixed gear wheels (2, 3, 4) being supported by the first transmission input shaft (w_k1), the single fixed gear wheel (1) on the second transmission input shaft (w_K2) engaging one idler gear wheel on the first countershaft (w_v1) and one idler gear wheel on the second countershaft (w_v2) while one of the three fixed gear wheels (2 or 4) on the first transmission input shaft (w_K1) engaging one idler gear wheel on the first countershaft (w_v1) and one idler gear wheel on the second countershaft (w_v2);

a plurality of coupling devices (A, B, C, D, E, F) being supported on one of the first and the second countershafts (w v1, w_v2), and each of the plurality of coupling devices (A, B, C, D, E, F) coupling an idler gear wheel (5, 6, 7, 8, 9, 10) in a rotationally fixed manner to one of the first and the second countershafts (w_v1, w_v2);

first and second output gear wheels (12, 13) each engaging gearing of an output shaft (w_ab), at least one shifting device (K), supported by one of the first and the second countershafts (w_v1, w_v2), for directly connecting two adjacent gear wheels, on the same countershaft (w_v1 or w_v2), with one another such that several power shiftable forward gears (1, 2, 3, 4, 5, 6) and at least one reverse gear (R1, R2, R3) are shiftable;

a first dual gear plane (5-8) comprising an idler gear wheel (5) supported by the first countershaft (w_v1), an idler gear wheel (8) supported by the second countershaft (w_v2) and the single fixed gear wheel (1) supported by the second transmission input shaft (w_k2), a second dual gear plane (7-10; 6-9) comprising an idler gear wheel (6, 7) supported by the first countershaft (w_v1), an idler gear wheel (9, 10) supported by the second countershaft (w_v2) and a first one of the three fixed gear wheels (2, 3, 4) supported by the first input shaft (w_k1), and at least one of the idler gear wheels (5, 6, 7, 8, 9, 10) supported by the first and the second countershafts (w_v1, w_v2), in each of the first and the second dual gear planes (5-8, 7-10; 5-8, 6-9), being utilized for implementing at least two of the gears; and first and second single gear planes (6-2, 3-9; 7-3, 4-10) each comprising an idler gear wheel (6, 9, 7, 10) supported by one of the first and the second countershafts (w_v1, w_v2) and a second or third of the three fixed gear wheels (1, 2, 3, 4) supported by the first transmission input shaft (w_k1), such that at least one powershift winding-path gear is shiftable via the at least one shifting device (K).

17. A double clutch transmission having seven forward gears and three reverse gears, the double clutch transmission comprising:

first and second clutches (K1, K2) each having an input side connected to a drive input shaft (w_an) and an output side respectively connected to one of first and second transmission input shafts (w_k1, w_k2) arranged coaxially with one another;

at least first and second countershafts (w_v1, w_v2) rotatably supporting idler gear wheels (5, 6, 7, 8, 9, 10);

only a single fixed gear wheel being supported by the second transmission input shaft (w_k2) while only three fixed gear wheels (2, 3, 4) being supported by the first transmission input shaft (w_k1), the single fixed gear wheel (1) on the second transmission input shaft (w_K2) engaging one idler gear wheel on the first countershaft (w_v1) and one idler gear wheel on the second countershaft (w_v2) while one of the three fixed gear wheels (2 or 4) on the first transmission input shaft (w_K1) engaging one idler gear wheel on the first countershaft (w_v1) and one idler gear wheel on the second countershaft (w_v2);

a plurality of coupling devices (A, B, C, D, E, F) being supported on one of the first and the second countershafts (w_v1, w_v2), and each of the plurality of coupling devices (A, B, C, D, E, F) coupling an idler gear wheel (5, 6, 7, 8, 9, 10) in a rotationally fixed manner to one of the first and the second countershafts (w_v1, w_v2);

first and second output gear wheels (12, 13) each engaging gearing of an output shaft (w_ab);

at least one shifting device (K), supported on one of the first and the second countershafts (w_v1, w_v2), for directly connecting two adjacent gear wheels, on the same countershaft (w_v1 or w_v2), with one another such that several power shiftable forward gears (1, 2, 3, 4, 5, 6) and at least one reverse gear (R1, R2, R3) are shiftable;

a first dual gear plane (5-8) comprising an idler gear wheel (5) supported by the first countershaft (w_v1), an idler gear wheel (8) supported by the second countershaft (w_v2) and the single fixed gear wheel (1) supported by the second transmission input shaft (w_k2), a second dual gear plane (7-10; 6-9) comprising an idler gear wheel (6, 7) supported by the first countershaft (w_v1), an idler gear wheel (9, 10) supported by the second countershaft (w_v2) and a first one of the three fixed gear wheels (2, 3, 4) supported by the first input shaft (w_k1), and at least one of the idler gear wheels (5, 6, 7, 8, 9, 10) supported by the first and the second countershafts (w_v1, w_v2), in each of the first and the second dual gear planes (5-8, 7-10; 5-8, 6-9), being utilized for implementing at least two of the gears; and first and second single gear planes (6-2, 3-9; 7-3, 4-10) each comprising an idler gear wheel (6, 9, 7, 10) supported by one of the first and the second countershafts (w_v1, w_v2) and a second or third of the three fixed gear wheels (1, 2, 3, 4) supported by the first transmission input shaft (w_k1), such that at least one powershift winding-path gear is shiftable via the at least one shifting device (K); and the at least one shifting device (K) coupling one of the idler gear wheels (8) of the first dual gear plane (5-8) with an idler gear wheel of one of the second dual gear plane (7-10; 6-9), the first single gear plane and the second single gear plane (6-2, 3-9, 7-3 or 4-10).

* * * * *